United States Patent
Su et al.

(10) Patent No.: US 11,240,131 B2
(45) Date of Patent: Feb. 1, 2022

(54) SYSTEMS AND METHODS FOR EVALUATING A USER EXPERIENCE IN A NETWORK BASED ON PERFORMANCE INDICATORS

(71) Applicant: Verizon Patent and Licensing Inc., Arlington, VA (US)

(72) Inventors: Le Su, Edison, NJ (US); Ye Ouyang, Warren, NJ (US); Wenyuan Lu, Raritan, NJ (US); Krishna Pichumani Iyer, Basking Ridge, NJ (US); Khurram Abbas, Novi, MI (US); Steven F. Rice, Keller, TX (US); Garrison William Brainard, Hillsborough, NJ (US); Dwight Ellis Woods, Chester, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/387,012

(22) Filed: Apr. 17, 2019

(65) Prior Publication Data
US 2020/0336396 A1 Oct. 22, 2020

(51) Int. Cl.
*H04L 12/24* (2006.01)
*H04L 12/26* (2006.01)
*G06N 20/20* (2019.01)

(52) U.S. Cl.
CPC .......... *H04L 43/065* (2013.01); *G06N 20/20* (2019.01); *H04L 41/5009* (2013.01);
(Continued)

(58) Field of Classification Search
None
See application file for complete search history.

(56) References Cited

U.S. PATENT DOCUMENTS

| | | | |
|---|---|---|---|
| 9,538,401 B1* | 1/2017 | Ouyang | H04W 24/02 |
| 2014/0269269 A1* | 9/2014 | Kovvali | H04W 24/04 |
| | | | 370/229 |

(Continued)

OTHER PUBLICATIONS

Laselva et al. "Advancements of QoE Assessment and Optimization in Mobile Networks in the Machine Era", WCNCW Conference, Apr. 15, 2018 [retrieved on Oct. 6, 2020]. Retrieved from the Internet: <URL: https://ieeexplore.ieee.org/stamp/stamp.jsp?tp=&arnumber=8369036>. (Year: 2018).*

(Continued)

*Primary Examiner* — Kevin T Bates
*Assistant Examiner* — Dae Kim

(57) ABSTRACT

A device may collect network performance data associated with a user equipment of a network. The network performance data may include information associated with a plurality of performance indicators of the network. The device may process information associated with a first portion of the plurality of performance indicators to determine a first performance category experience score, and information associated with a second portion of the plurality of performance indicators to determine a second performance category experience score. The device may process the first performance category experience score and the second performance category experience score to determine a network experience score. The device may determine whether the network experience score satisfies a threshold value. The device may perform one or more actions based on determining that the network experience score satisfies the threshold value.

20 Claims, 8 Drawing Sheets

(52) U.S. Cl.
CPC .......... *H04L 41/5067* (2013.01); *H04L 43/08* (2013.01); *H04L 41/5087* (2013.01); *H04L 41/5093* (2013.01)

(56) References Cited

U.S. PATENT DOCUMENTS

| | | | |
|---|---|---|---|
| 2014/0287747 A1* | 9/2014 | Agarwal | H04W 4/029 455/433 |
| 2015/0289149 A1* | 10/2015 | Ouyang | H04W 16/18 370/252 |
| 2016/0352924 A1* | 12/2016 | Senarath | H04M 15/8033 |
| 2018/0192303 A1* | 7/2018 | Hui | H04W 24/04 |
| 2019/0068443 A1* | 2/2019 | Li | H04L 43/022 |
| 2019/0228309 A1* | 7/2019 | Yu | G06N 3/0454 |
| 2019/0239101 A1* | 8/2019 | Ouyang | G06N 3/084 |
| 2019/0313267 A1* | 10/2019 | Joul | H04L 67/303 |
| 2019/0356565 A1* | 11/2019 | Zeng | H04L 43/04 |
| 2020/0015101 A1* | 1/2020 | Kucera | H04W 72/1231 |
| 2020/0106682 A1* | 4/2020 | Pendyala | H04L 41/5038 |
| 2020/0266903 A1* | 8/2020 | De Rosa | H04W 4/00 |

OTHER PUBLICATIONS

Vizzarri et al. "Quality of Experience Analysis for VoLTE Services through Artificial Neural Network Fitting", 2016 Int'l Conf'r on Wireless Networks and Mobile Communications, Oct. 26, 2016 [retrieved on Mar. 25, 2021]. Retrieved from the Internet: <URL: https://ieeexplore.ieee.org/document/7777208>. (Year: 2016).*

Laselva et al. "Advancements of QoE assessment and optimization in mobile networks in the machine era", 2018 IEEE WCNCW, Apr. 15, 2018 [retrieved on Sep. 28, 2021]. INSPEC Accession No. 17806253, DOI: 10.1109/WCNCW.2018.8369036. (Year: 2018).*

\* cited by examiner

SYSTEMS AND METHODS FOR EVALUATING A USER EXPERIENCE IN A NETWORK BASED ON PERFORMANCE INDICATORS

BACKGROUND

A network may monitor factors relating to a user's quality of experience (QoE) to determine a level of user satisfaction with the network and/or a service of the network. QoE is user-dependent, and therefore, may vary between users even when a quality of service (QoS) of the network is consistent among the users.

DETAILED DESCRIPTION OF PREFERRED EMBODIMENTS

Figure 1A:
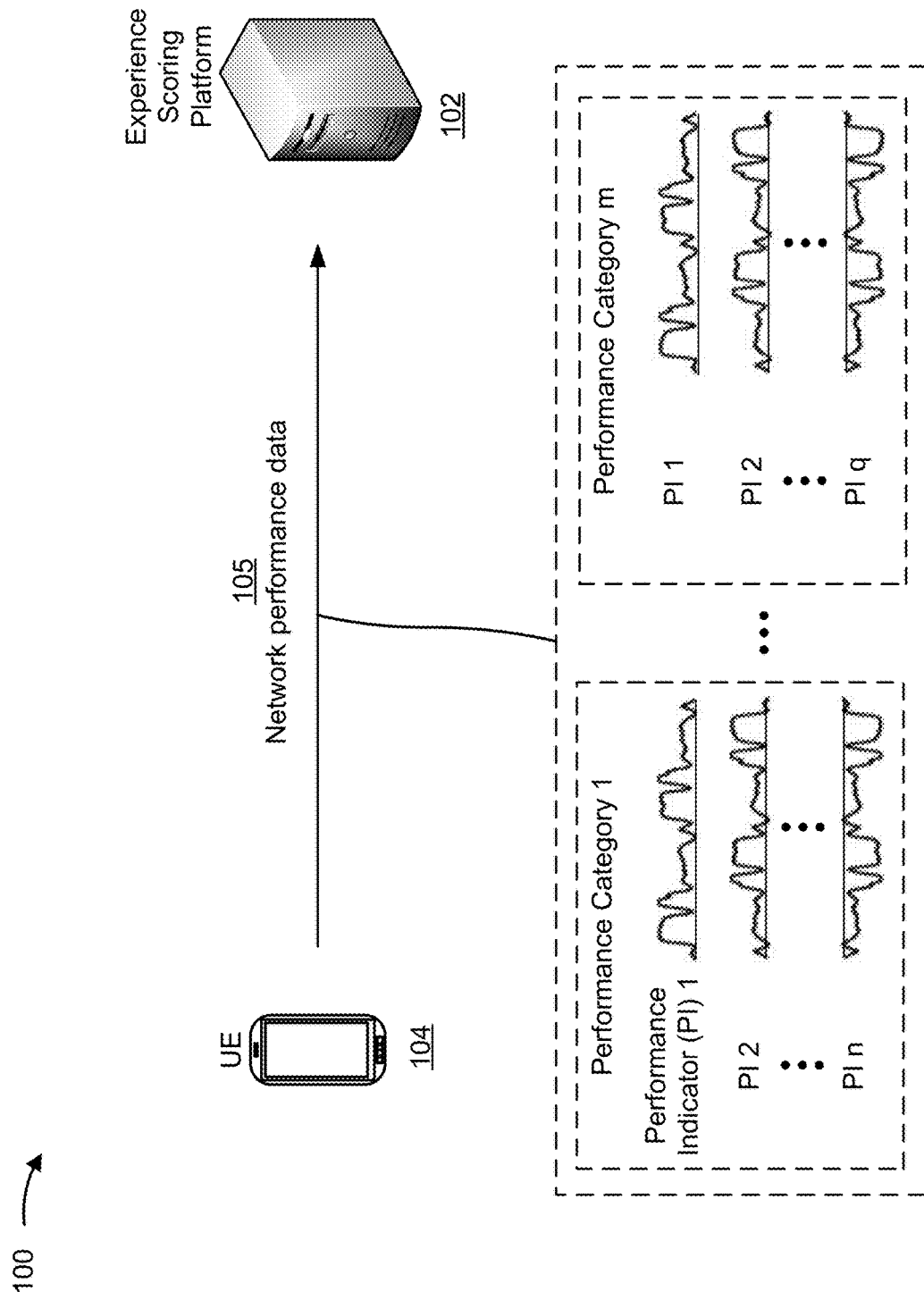
FIGS. 1A and 1B are diagrams of one or more example implementations described herein.

The following detailed description of example implementations refers to the accompanying drawings. The same reference numbers in different drawings may identify the same or similar elements.

QoE may provide a measure of performance of a network from a perspective of a user of the network. Accordingly, a network may collect information relating to a user equipment (UE) of the network and analyze the information to determine a QoE for a user associated with the UE. For example, the information may be used by the network to calculate scores for one or more key performance indicators (KPI) of the network. Based on one or more of the scores, the network may determine a QoE for a user.

Numerous KPIs may be used, to varying degrees, to measure a QoE of a user. In addition, different users may have different uses, usage amounts, usage times, and/or expectations of the network. Accordingly, quantifying QoE of a user is difficult and often based on an arbitrary selection of KPIs. Therefore, current approaches to determine a QoE of a user may produce results that are inaccurate and/or results that poorly reflect actual perceptions of the user. As a consequence, current approaches may fail to detect and/or anticipate when a performance of the network is resulting in a poor QoE for a user. This may lead to increases in customer support requests, which may consume considerable network, computing, and/or human resources, and/or lead to increases in user attrition from the network.

Some implementations described herein provide for improved measurement of QoE for a user of a network. As described herein, an experience scoring platform may collect network performance data associated with a UE of a user. The network performance data may include information associated with a plurality of KPIs that are determined to have a correlation to QoE, and respective KPIs may belong to one of a plurality of performance categories. The experience scoring platform may determine, for the user, an experience score for respective performance categories based on weightings of KPIs belonging to the respective performance categories. The experience scoring platform may determine, for the user, a network experience score (e.g., a network experience score for voice communication and/or a network experience score for data communication) based on weightings of the performance category experience scores. The experience scoring platform may determine, for the user, an overall experience score based on weightings of a network experience score for voice communication and a network experience score for data communication. In some implementations, the experience scoring platform may receive feedback from the user regarding the overall experience score, a network experience score for voice communication, and/or a network experience score for data communication, and may update the weightings of the KPIs and/or the performance category experience scores based on the feedback. In some implementations, the experience scoring platform may perform one or more actions based on determining that an experience score for a user satisfies a threshold value.

In this way, the experience scoring platform provides a tool to efficiently characterize QoE of a user with improved accuracy. For example, the experience scoring platform may determine KPIs that are correlated (e.g., strongly correlated) to QoE to thereby reduce noisy data and other immaterial data when generating experience scores. Furthermore, the weightings employed by the experience scoring platform may be tuned based on feedback from users. As a result, experience scores generated by the experience scoring platform provide an accurate characterization of QoE for a user, which facilitates anticipating and addressing QoE issues before the issues are perceived by the user and/or before the issues negatively affect QoE of the user. In this way, the experience scoring platform facilitates a reduction of interactions between users and customer support, thereby conserving network, computing, and/or other resources. Furthermore, the experience scoring platform facilitates user retention, and maintains predictability and stability in network resource usage.

Figure 1B:
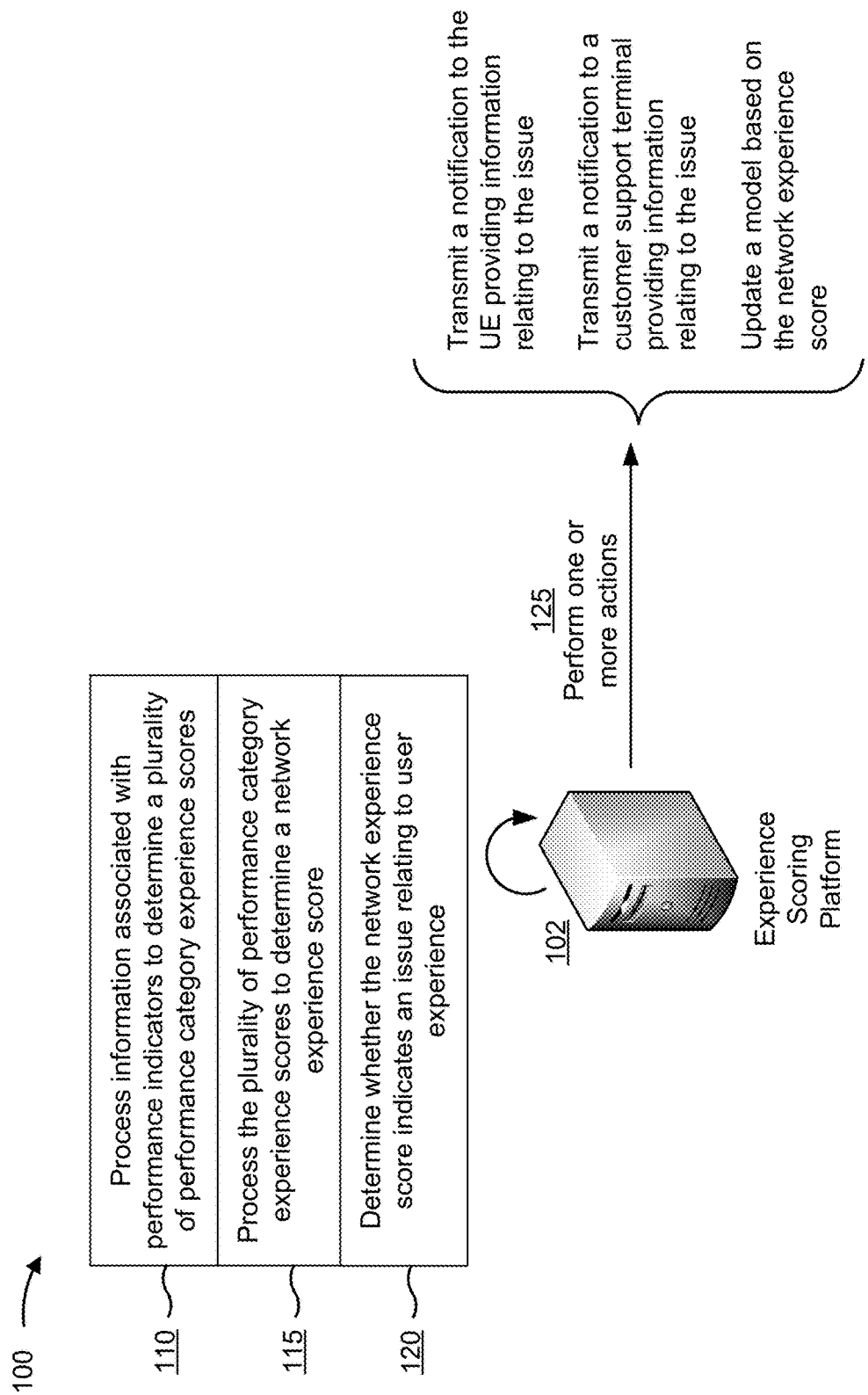

FIGS. 1A and 1B are diagrams of one or more example implementations 100 described herein. As shown in FIGS. 1A and 1B, example implementation(s) 100 may include an experience scoring platform 102 that obtains network performance data from a UE 104.

Experience scoring platform 102 (e.g., an experience scoring platform may include one or more server devices) may be associated with a network (e.g., a wireless network). Experience scoring platform 102 may process network performance data associated with UE 104. For example, experience scoring platform 102 may process the network performance data to determine one or more experience scores for a user of UE 104.

UE 104 may be a communication and/or computing device, such as a mobile phone, a smart phone, a laptop computer, a tablet computer, a telematics device, an Internet of things (IoT) device, and/or the like. UE 104 may be associated with a network (e.g., a wireless network) and may communicate with a data network (e.g., the Internet) or a telephone network (e.g., the Public Switched Telephone Network (PSTN)) via a core network of the network. While the description to follow will discuss network performance data and experience scores for a single UE, experience scoring platform 102 may obtain network performance data and generate experience scores for hundreds, thousands, millions, or more UEs.

As shown in FIG. 1A, and by reference number 105, experience scoring platform 102 may obtain network performance data associated with UE 104. The network performance data may include information associated with a plurality of KPIs relating to a network (e.g., relating to a radio access network (RAN) of the network). The information associated with the plurality of KPIs may include values relating to the plurality of KPIs over a time period (e.g., 1 day, 1 week, 1 month, and/or the like).

An administrator of experience scoring platform 102 may select the plurality of KPIs that are to be included in the network performance data. Additionally, or alternatively, experience scoring platform 102 may utilize a model (e.g., a machine learning model) to select the plurality of KPIs that are to be included in the network performance data. Selection of any one specific or individual KPI may be based on a correlation between the KPI and QoE. For example, selection of a KPI may be based on a correlation between the KPI (e.g., a KPI relating to the RAN) and a KPI relating to an application (e.g., an application of a UE). For example, experience scoring platform 102 (e.g., utilizing a model) may determine a correlation between a downlink (DL) radio link control (RLC) volume KPI and a total application volume KPI. As another example, experience scoring platform 102 (e.g., utilizing a model) may determine a correlation between an uplink (UL) RLC volume KPI and a streaming total volume KPI. A correlation may be represented as a percentage that provides a measure of a degree of the correlation.

Experience scoring platform 102 (e.g., utilizing a model) and/or an administrator of experience scoring platform 102 may select a KPI for inclusion in the network performance data when a correlation (e.g., a correlation percentage) satisfies a threshold value (e.g., a 75% correlation, a 90% correlation, a 95% correlation, and/or the like). Additionally, or alternatively, experience scoring platform 102 (e.g., utilizing a model) and/or an administrator of experience scoring platform 102 may select a KPI for inclusion in the network performance data when an accuracy of a performance category experience score and/or a network experience score is improved with the inclusion of the KPI in the network performance data (e.g., a performance category experience score generated by a model is closer to an updated performance category experience score provided by a user when the KPI is included in the network performance data).

Experience scoring platform 102 may generate and/or store a mapping that associates the plurality of KPIs with respective correlations (e.g., correlation percentages) to QoE. In some implementations, experience scoring platform 102 may generate and/or store a mapping that associates the plurality of KPIs with respective value directions (e.g., whether a higher value or a lower value indicates a better QoE for a particular KPI). Experience scoring platform 102 may train a model with the mappings (e.g., a model that generates performance category experience scores). In addition, experience scoring platform 102 may generate and/or store a mapping that associates one or more of the plurality of KPIs with voice communications on the network, one or more of the plurality of KPIs with data communications on the network, and/or one or more of the plurality of KPIs with short message service (SMS) communications on the network.

KPIs relating to voice communications may include a session establishment effectiveness ratio (SEER), a call drop rate, a call connection rate, a call setup failure rate, and/or the like. The KPIs relating to voice communications may relate to voice over Long-Term Evolution (VoLTE) communications and/or voice over 5G (Vo5G) communications. KPIs relating to data communications may include a data connection rate, a radio resource control (RRC) setup failure rate, an RRC drop rate, a packet data network (PDN) connection failure rate, a context drop rate, and/or the like. The KPIs relating to data communications may relate to LTE communications and/or 5G communications.

Experience scoring platform 102 may train a model with the mapping (e.g., a model that generates performance category experience scores) to permit the model to differentiate between KPIs relating to voice communications, KPIs relating to data communications, and KPIs relating to SMS communications. Experience scoring platform 102 may obtain the network performance data as a first set of KPIs relating to voice communications, a second set of KPIs relating to data communications, and/or a third set of KPIs relating to SMS communications (e.g., based on the mapping).

Experience scoring platform 102 may generate and/or store a mapping that associates respective KPIs of the plurality of KPIs with a performance category. Experience scoring platform 102 may train a model with the mapping to permit the model to identify a performance category that is associated with a KPI. Experience scoring platform 102 may obtain the network performance data as a first set of KPIs relating to a first performance category, a second set of KPIs relating to a second performance category, and so forth (e.g., based on the mapping).

The performance categories may relate to an accessibility of service of the network (referred to herein as "accessibility"), a retainability of service of the network (referred to herein as "retainability"), a mobility of the user equipment (referred to herein as "mobility"), an integrity of service of the network (referred to herein as "integrity"), or an availability of the network (referred to herein as "availability"). In some implementations, a performance category may relate to a utilization of a network slice instance. The aforementioned performance categories are illustrative and are not intended to be an exhaustive list.

The accessibility performance category may include KPIs that relate to whether a service requested by a user may be accessed in a particular condition (e.g., RRC setup success rate, call setup success rate, and/or the like). The retainability performance category may include KPIs that relate to a persistence of a service (e.g., call drop rate, session time, and/or the like). The mobility performance category may include KPIs that relate to a persistence of a service while a user is moving (e.g., intra-frequency handover success rate, inter-frequency handover success rate, inter-radio access technology (inter-RAT) handover success rate, and/or the like). The integrity performance category may include KPIs that relate to a character of a service (e.g., throughput, latency, packet loss, and/or the like). The availability performance category may include KPIs that relate to an availability of a service (e.g., cell availability, partial cell availability, and/or the like). A first plurality of KPIs associated with accessibility, retainability, mobility, integrity, and/or availability may be associated with a voice communications experience of the user, a second plurality of KPIs associated with accessibility, retainability, mobility, integrity, and/or availability may be associated with a data communications experience of the user, and/or a third plurality of KPIs associated with accessibility, retainability, mobility, integrity, and/or availability may be associated with an SMS communications experience of the user.

As shown in FIG. 1B, and by reference number 110, experience scoring platform 102 may process the information associated with the plurality of KPIs to determine a plurality of performance category experience scores (e.g., for the user associated with UE 104). For example, experience scoring platform 102 may process a first portion of the information that is associated with KPIs included in a first performance category to determine a first performance category experience score, process a second portion of the information that is associated with KPIs included in a second performance category to determine a second performance category experience score, and so forth.

Experience scoring platform 102 may determine a performance category experience score for the accessibility performance category based on KPIs associated with the accessibility performance category. Additionally, or alternatively, experience scoring platform 102 may determine a performance category experience score for the retainability performance category based on KPIs associated with the retainability performance category. Additionally, or alternatively, experience scoring platform 102 may determine a performance category experience score for the mobility performance category based on KPIs associated with the mobility performance category. Additionally, or alternatively, experience scoring platform 102 may determine a performance category experience score for the integrity performance category based on KPIs associated with the integrity performance category. Additionally, or alternatively, experience scoring platform 102 may determine a performance category experience score for the availability performance category based on KPIs associated with the availability performance category.

A performance category experience score may be based on weightings of KPIs included in the performance category. For example, experience scoring platform 102 may obtain (e.g., from the network performance data) respective values for KPIs included in the performance category, apply respective weights to the values to obtain weighted values, and sum the weighted values to determine the performance category experience score. In some implementations, a value for a KPI may be a measurement of a measurable parameter associated with the KPI or a result of a calculation based on one or more measurable parameters associated with the KPI. In some implementations, a value for a KPI may be an average value, a maximum value, a minimum value, a median value, or a modal value obtained from multiple measurements or multiple results of calculations over a time period.

Experience scoring platform 102 may normalize a value for a KPI before applying a weighting to the value. For example, experience scoring platform 102 may normalize a value for a KPI by determining an area under a curve (AUC) value of a time series of measurements associated with the KPI. Experience scoring platform 102 then may apply a weighting to the AUC value.

Experience scoring platform 102 may determine respective weightings for the plurality of KPIs. Respective weightings for a plurality of KPIs included in a particular performance category may sum to 1 (e.g., 100%). Experience scoring platform 102 may determine a weighting for a KPI based on a degree to which the KPI relates to QoE. For example, experience scoring platform 102 may determine a weighting for a KPI based on a correlation (e.g., a correlation percentage) of the KPI to QoE, as described above.

Experience scoring platform 102 may utilize one or more artificial intelligence techniques, such as machine learning, deep learning, and/or the like to determine respective weightings for a plurality of KPIs included in a particular performance category and generate a performance category experience score for the particular performance category. For example, experience scoring platform 102 may utilize a neural network (e.g., a deep neural network, a convolutional neural network, a feedforward neural network, a long short-term memory neural network (e.g., to process multiple time series), a generative adversarial network (e.g., to detect an anomaly in a KPI), and/or the like) to determine respective weightings for a plurality of KPIs included in a particular performance category and generate a performance category experience score for the particular performance category.

Experience scoring platform 102 may determine a performance category experience score based on KPI values, as described herein. For example, using associations between KPIs and QoE, experience scoring platform 102 may determine a performance category experience score based on KPI values. In this case, experience scoring platform 102 may generate a model. For example, experience scoring platform 102 may train a model using information that includes a plurality of associations between KPIs and QoE. As an example, experience scoring platform 102 may determine that past KPI values are associated with a particular performance category experience score. In some implementations, experience scoring platform 102 may use a weighting system (e.g., with relatively high weights and/or relatively low weights) to determine a performance category experience score based on KPI values. In this case, experience scoring platform 102 may determine that a relatively high weight is to be assigned to KPIs that are determined to be highly associated with QoE. In contrast, experience scoring platform 102 may determine that a relatively low weight is to be assigned to KPIs that are determined to be minimally associated with QoE.

Experience scoring platform 102 may perform a training operation when generating the model. For example, experience scoring platform 102 may portion KPI values into a training set (e.g., a set of data to train the model), a validation set (e.g., a set of data used to evaluate a fit of the model and/or to fine tune the model), a test set (e.g., a set of data used to evaluate a final fit of the model), and/or the like. Additionally, or alternatively, experience scoring platform 102 may train the model using a supervised training procedure that includes receiving input (e.g., input relating to associations between KPIs and QoE) to the model from a subject matter expert.

In some implementations, experience scoring platform 102 may use one or more other model training techniques, such as a neural network technique. For example, experience scoring platform 102 may perform an artificial neural network processing technique (e.g., using a two-layer feedforward neural network architecture, a three-layer feedforward neural network architecture, and/or the like) to perform pattern recognition with regard to patterns of associations between KPIs and QoE. In this case, using the artificial neural network processing technique may improve an accuracy of a model generated by experience scoring platform 102 by being more robust to noisy, imprecise, or incomplete data, and by enabling experience scoring platform 102 to detect patterns and/or trends undetectable to human analysts or systems using less complex techniques.

Experience scoring platform 102 may tune the model. For example, experience scoring platform 102 may tune the model using information associated with a plurality of KPIs (e.g., values or normalized values for the plurality of KPIs) and an experience score associated with the information (e.g., an updated experience score provided by a user, as described below). Experience scoring platform 102 may train the model to determine, based on information associated with a plurality of KPIs, a plurality of performance category experience scores. In some implementations, experience scoring platform 102 may obtain and use a model that was trained and/or tuned elsewhere (e.g., by a separate platform).

In some implementations, the model may process uncategorized information associated with the plurality of KPIs. For example, the model may process uncategorized information associated with the plurality of KPIs (e.g., uncategorized as to performance category) and determine performance category experience scores based on the information by associating KPIs with performance categories. As another example, the model may process uncategorized information associated with the plurality of KPIs (e.g., uncategorized as to communication type) and determine respective performance category experience scores (e.g., for voice communications, data communications, and/or SMS communications) based on the information by associating KPIs with communication types. In some implementations, the model may process categorized information associated with the plurality of KPIs (e.g., categorized as to performance category and/or communication type).

As shown by reference number 115, experience scoring platform 102 may process a plurality of performance category experience scores to determine a network experience score (e.g., for the user associated with UE 104). Experience scoring platform 102 may determine a network experience score for voice communications, a network experience score for data communications, and/or a network experience score for SMS communications. For example, experience scoring platform 102 may process a plurality of performance category experience scores relating to voice communications to determine a network experience score for voice communications, and experience scoring platform 102 may process a plurality of performance category experiences scores relating to data communications to determine a network experience score for data communications.

A network experience score may be based on a weighting of performance category experience scores (e.g., a network experience score for voice communications may be based on a weighting of performance category experience scores relating to voice communications). For example, experience scoring platform 102 may obtain a plurality of performance category experience scores (e.g., as an output of a model), apply respective weights to the plurality of performance category experience scores to obtain weighted scores, and sum the weighted scores to determine the network experience score.

Experience scoring platform 102 may determine respective weightings for the plurality of performance category experience scores. Respective weightings for the plurality of performance category experience scores may sum to 1 (e.g., 100%). Experience scoring platform 102 may determine a weighting for a performance category experience score based on a degree to which a performance category associated with the performance category experience score relates to QoE.

Experience scoring platform 102 may utilize one or more artificial intelligence techniques, such as machine learning, deep learning, and/or the like to determine respective weightings for a plurality of performance category experience scores and generate a network experience score. For example, experience scoring platform 102 may utilize a neural network (e.g., a deep neural network, a convolutional neural network, a feedforward neural network, and/or the like) to determine respective weightings for a plurality of performance category experience scores and generate a network experience score.

Experience scoring platform 102 may train and/or tune a model to generate network experience scores in a manner similar to that discussed above regarding the model for generating performance category experience scores. For example, experience scoring platform 102 may train the model using a supervised training procedure that includes receiving input (e.g., input relating to associations between performance categories and QoE) to the model from a subject matter expert. Experience scoring platform 102 may tune the model using information associated with a plurality of KPIs (e.g., values or normalized values for the plurality of KPIs) and information that identifies an experience score associated with the information (e.g., an updated experience score provided by a user, as described below). Experience scoring platform 102 may train the model to determine, based on information associated with a plurality of performance category experience scores, a network experience score. In some implementations, experience scoring platform 102 may obtain and use a model that was trained elsewhere (e.g., by a separate platform).

In some implementations, the model may process uncategorized information associated with the plurality of performance category experience scores. For example, the model may process uncategorized information associated with the plurality of performance category experience scores (e.g., uncategorized as to communication type) and determine network experience scores based on the information by associating performance category experience scores with communication types (e.g., voice communications, data communications, and/or SMS communications). In some implementations, the model may process categorized information associated with the plurality of performance category experience scores (e.g., categorized as to communication type).

Experience scoring platform 102 may determine an overall experience score (e.g., for the user associated with UE 104). For example, experience scoring platform 102 may process a network experience score for voice communications, a network experience score for data communications, and/or a network experience score for SMS communications to determine an overall experience score.

An overall experience score may be based on a weighting of a network experience score for voice communications, a weighting of a network experience score for data communications, and/or a weighting of a network experience score for SMS communications. For example, experience scoring platform 102 may obtain a network experience score for voice communications and a network experience score for data communications (e.g., as an output of a model), apply respective weights to the network experience score for voice communications and the network experience score for data communications to obtain weighted scores, and sum the weighted scores to determine the overall experience score. In this way, the overall experience score may provide a measure of QoE that reflects a type of usage of the network by the user.

Experience scoring platform 102 may determine respective weightings for the network experience scores. For example, experience scoring platform 102 may determine a voice communications usage (e.g., an amount of time) for a user and determine a voice percentile for the voice communications usage of the user relative to one or more other users on the network. As another example, experience scoring platform 102 may determine a data communications usage (e.g., a volume of data) for the user and determine a data percentile for the data communications usage of the particular user relative to one or more other users on the network.

Based on the voice percentile and the data percentile, experience scoring platform 102 may determine a preference ratio for the user that provides a measure of whether a usage of the network by the user is voice preferred, voice biased, neutral, data biased, data preferred, or an intermediate characterization. Experience scoring platform 102 may determine the preference ratio (PR) as a difference of the voice percentile ($P_V$) and the data percentile ($P_D$) divided by a sum of the voice percentile and the data percentile $$\left(e.g., PR = \frac{P_V - P_D}{P_V + P_D}\right).$$

Accordingly, a preference ratio of −1 indicates that the user is data preferred, a preference ratio of 0 indicates that the user is neutral, a preference ratio of 1 indicates that the user is voice preferred, and so forth.

Experience scoring platform 102 may determine weightings for a network experience score for voice communications and a network experience score for data communications based on the preference ratio. For example, experience scoring platform 102 may determine a weighting for a network experience score for voice communications ($W_V$) based on the preference ratio $$\left(e.g., W_V = \frac{1 + PR}{2}\right)$$

and a network experience score for data communications ($W_D$) based on the preference ratio $$\left(e.g., W_D = \frac{1 - PR}{2}\right).$$

Respective weightings for the network experience scores may sum to 1 (e.g., 100%).

As shown by reference number 120, experience scoring platform 102 may determine whether a network experience score, or an overall experience score, indicates an issue relating to QoE (e.g., for the user associated with UE 104). For example, experience scoring platform 102 may determine whether a network experience score for voice communications indicates an issue relating to QoE for voice communications and/or determine whether a network experience score for data communications indicates an issue relating to QoE for data communications. As another example, experience scoring platform 102 may determine whether an overall experience score indicates an issue relating to overall QoE. Experience scoring platform 102 may determine whether a performance category experience score indicates an issue relating to QoE.

Experience scoring platform 102 may determine that an experience score (e.g., an overall experience score, a network experience score, or a performance category experience score) indicates an issue relating to QoE when the experience score satisfies a threshold value. For example, if an experience score is provided on a scale from 0-100, experience scoring platform 102 may determine that the experience score indicates an issue relating to QoE when the experience score is less than 80, less than 50, etc. In this way, experience scoring platform 102 may facilitate efficient identification of issues relating to QoE to thereby anticipate when a user may become dissatisfied with a service of the network and address the issue.

After determining that an overall experience score and/or a network experience score indicates an issue relating to QoE, experience scoring platform 102 may identify the issue relating to QoE. For example, experience scoring platform 102 may analyze one or more performance category experience scores associated with the overall experience score or the network experience score to determine whether the issue relates to one or more particular performance categories. Experience scoring platform 102 may analyze a performance category experience score (e.g., to determine whether the issue may relate to a performance category associated with the performance category experience score) by comparing the performance category experience score to a threshold value, comparing the performance category experience score to one or more performance category experience scores for one or more other users, comparing the performance category experience score to one or more historical performance category experience scores for the user, and/or the like.

As another example, experience scoring platform 102 may analyze one or more KPIs associated with the overall experience score or the network experience score (e.g., one or more KPIs included in a performance category determined to relate to the issue) to determine whether the issue relates to one or more particular KPIs. Experience scoring platform 102 may analyze a KPI (e.g., to determine whether the issue may relate to the KPI) by comparing a value for the KPI (e.g., an AUC value of a time series for the KPI) to a threshold value, comparing the value to one or more values for the KPI for one or more other users, comparing the value to one or more historical values for the KPI for the user, and/or the like.

As shown by reference number 125, experience scoring platform 102 may perform one or more actions (e.g., based on determining that an overall experience score, a network experience score, and/or a performance category experience score indicates an issue relating to QoE). For example, experience scoring platform 102 may perform one or more actions to address an issue indicated by a network experience score and/or an overall experience score.

Experience scoring platform 102 may transmit a notification to UE 104 (e.g., a text message, an email, a push notification, and/or the like) providing information relating to the issue. For example, the notification may provide an indication that the issue is present and/or a description of the issue. The notification may indicate that the issue is being addressed by the network. Additionally, or alternatively, the notification may request that the user identify whether the user is experiencing the issue. Additionally, or alternatively, the notification may request that the user identify whether to initiate a customer support communication (e.g., with a chatbot or with a customer support representative). Additionally, or alternatively, the notification may provide an overall experience score, a network experience score for voice communications, a network experience score for data communications, and/or a network experience score for SMS communications for the user, and request that the user provide an updated experience score (e.g., an updated overall experience score, an updated network experience score for voice communications, an updated network experience score for data communications, and/or an updated network experience score for SMS communications). The experience scoring platform 102 may update a model (e.g., a model that generates performance category experience scores and/or a model that generates network experience scores) with the updated experience score.

Experience scoring platform 102 may transmit a notification (e.g., an email, an alert, an entry in a queue, and/or the like) to a customer support terminal providing information relating to the issue. For example, the notification may provide an indication that the issue is present and/or a description of the issue. The notification may provide information relating to the issue, such as one or more performance category experience scores and/or one or more values for KPIs. Additionally, or alternatively, the notification may provide instructions for resolving the issue.

Experience scoring platform 102 may cause a customer support terminal to generate a display relating to the issue. For example, the display may include information (e.g., presented in a graphical format) relating to the issue, such as one or more performance category experience scores and/or one or more values for KPIs. The display may present instructions for resolving the issue. Additionally, or alternatively, the display may present information relating to the user (e.g., a name, a telephone number, an email address, an address, and/or the like) or UE 104 (e.g., a model number, an operating system, a listing of specifications, and/or the like). In this way, the display may prepare a customer service representative for a customer support communication from the user and/or permit the customer service representative to resolve the issue before receiving the customer support communication from the user.

Experience scoring platform 102 may provide an overall experience score and/or a network experience score to a user (e.g., in a graphical user interface). Experience scoring platform 102 may request that the user provide an updated experience score (e.g., an updated overall experience score, an updated network experience score for voice communications, an updated network experience score for data communications, and/or an updated network experience score for SMS communications). The updated experience score may indicate a measure of a perceived QoE by the user. The experience scoring platform 102 may update a model with the updated experience score (e.g., a model that generates performance category experience scores and/or a model that generates network experience scores). In this way, weightings employed by the model may be tuned according to feedback from the user to thereby improve the accuracy of experience scores generated by experience scoring platform 102.

As indicated above, FIGS. 1A and 1B are provided merely as examples. Other examples may differ from what is described with regard to FIGS. 1A and 1B. The number and arrangement of devices shown in FIGS. 1A and 1B are provided as an example. In practice, there may be additional devices, fewer devices, different devices, or differently arranged devices than those shown in FIGS. 1A and 1B. Furthermore, two or more devices shown in FIGS. 1A and 1B may be implemented within a single device, or a single device shown in FIGS. 1A and 1B may be implemented as multiple, distributed devices. Additionally, or alternatively, a set of devices (e.g., one or more devices) shown in FIGS. 1A and 1B may perform one or more functions described as being performed by another set of devices shown in FIGS. 1A and 1B.

Figure 2:
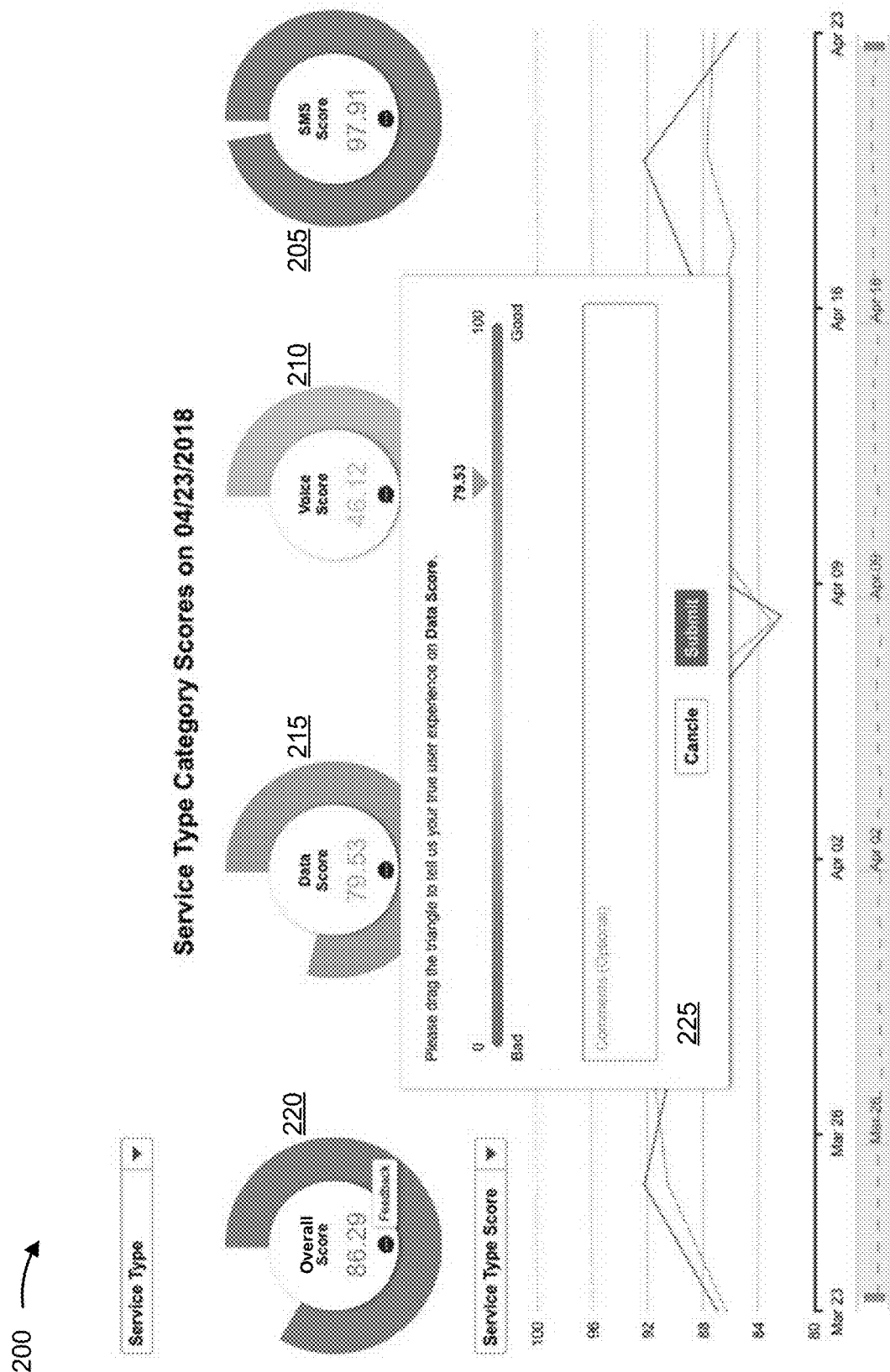
FIG. 2 is a diagram of an example implementation described herein.

FIG. 2 is a diagram of an example implementation 200 described herein. FIG. 2 shows an example user interface (e.g., a graphical user interface).

As shown in FIG. 2, an experience scoring platform (e.g., experience scoring platform 102) may generate a display of the user interface (UI). For example, the display of the UI may include an SMS communications network experience score 205, a voice communications network experience score 210, a data communications network experience score 215, and/or an overall experience score 220. SMS communications network experience score 205, voice communications network experience score 210, data communications network experience score 215, and/or overall experience score 220 may identify respective experience score values on a scale from 0-100 (other scales may be used). The values for SMS communications network experience score 205, voice communications network experience score 210, data communications network experience score 215, and/or overall experience score 220 may be determined by the experience scoring platform (e.g., experience scoring platform 102) in a manner similar to that described elsewhere herein.

SMS communications network experience score 205, voice communications network experience score 210, data communications network experience score 215, and/or overall experience score 220 may be represented in the display of the UI as respective gauges (e.g., gauges from 0-100). A gauge may include an indication (e.g., a color, a pattern, and/or the like) to visually represent a corresponding experience score. For example, a percentage of the gauge that is equivalent to the corresponding experience score may include the indication.

As further shown in FIG. 2, the display of the UI may include one or more input elements 225 by which a user (e.g., a user associated with the experience scores) may provide an updated experience score. For example, SMS communications network experience score 205 may be associated with an input element 225 by which the user may provide an updated experience score for SMS communications. As another example, voice communications network experience score 210 may be associated with an input element 225 by which the user may provide an updated experience score for voice communications. As an additional example, data communications network experience score 215 may be associated with an input element 225 by which the user may provide an updated experience score for data communications. As a further example, overall experience score 220 may be associated with an input element 225 by which the user may provide an updated overall experience score.

As further shown in FIG. 2, the display of the UI may permit a user to selectively view historical experience scores and/or view the historical experience scores over a configurable time period. The historical experience scores may be presented in the display of the UI as a time series graph.

As indicated above, FIG. 2 is provided merely as an example. Other examples may differ from what is described with regard to FIG. 2. The number and arrangement of elements shown in FIG. 2 are provided as an example. In practice, there may be additional elements, fewer elements, different elements, or differently arranged elements than those shown in FIG. 2. Furthermore, two or more elements shown in FIG. 2 may be implemented within a single element, or a single element shown in FIG. 2 may be implemented as multiple, distributed elements. Additionally, or alternatively, a set of elements (e.g., one or more elements) shown in FIG. 2 may perform one or more functions described as being performed by another set of elements shown in FIG. 2.

Figure 3A:
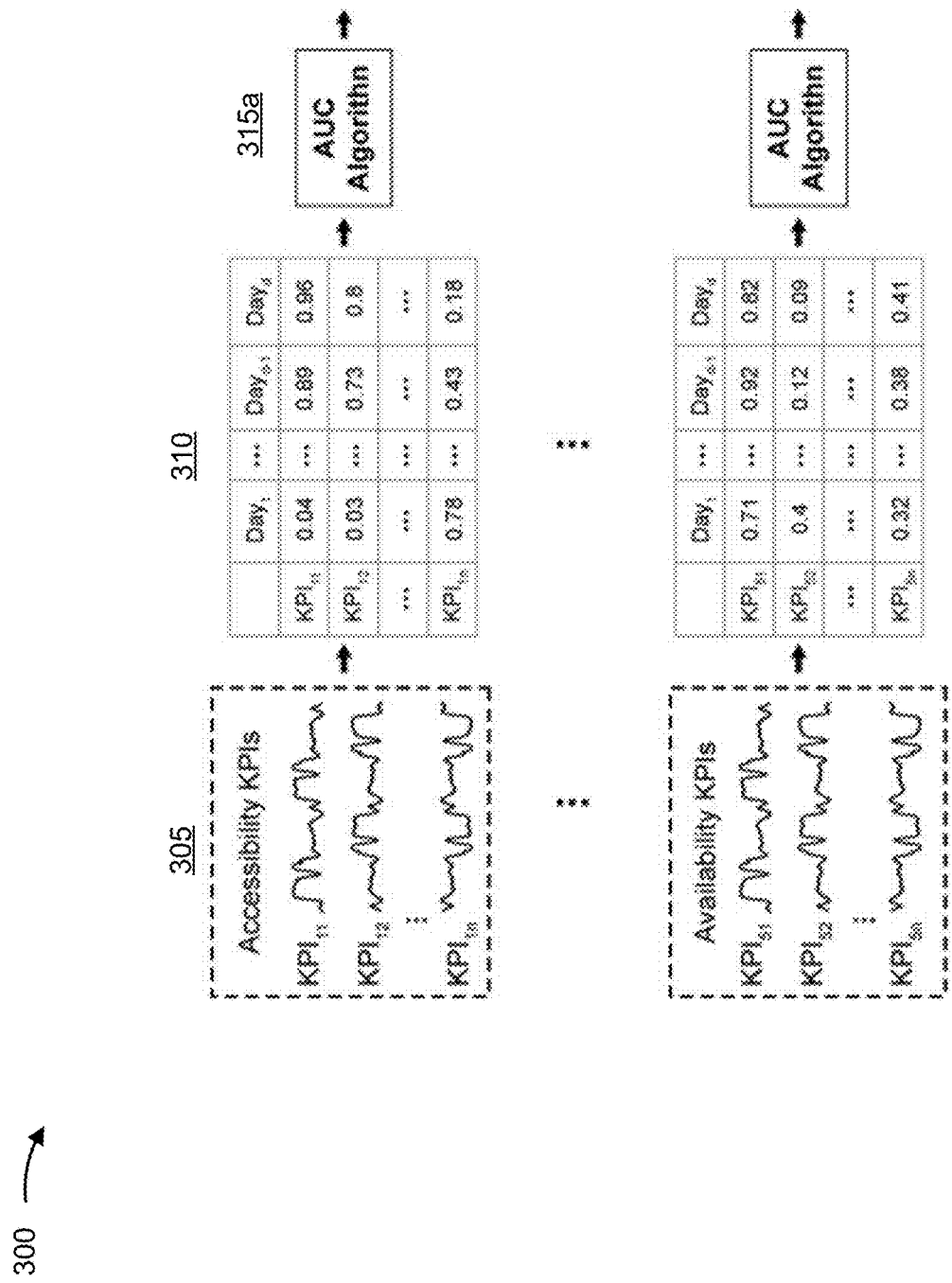
FIGS. 3A and 3B are diagrams of one or more example implementations described herein.
Figure 3B:
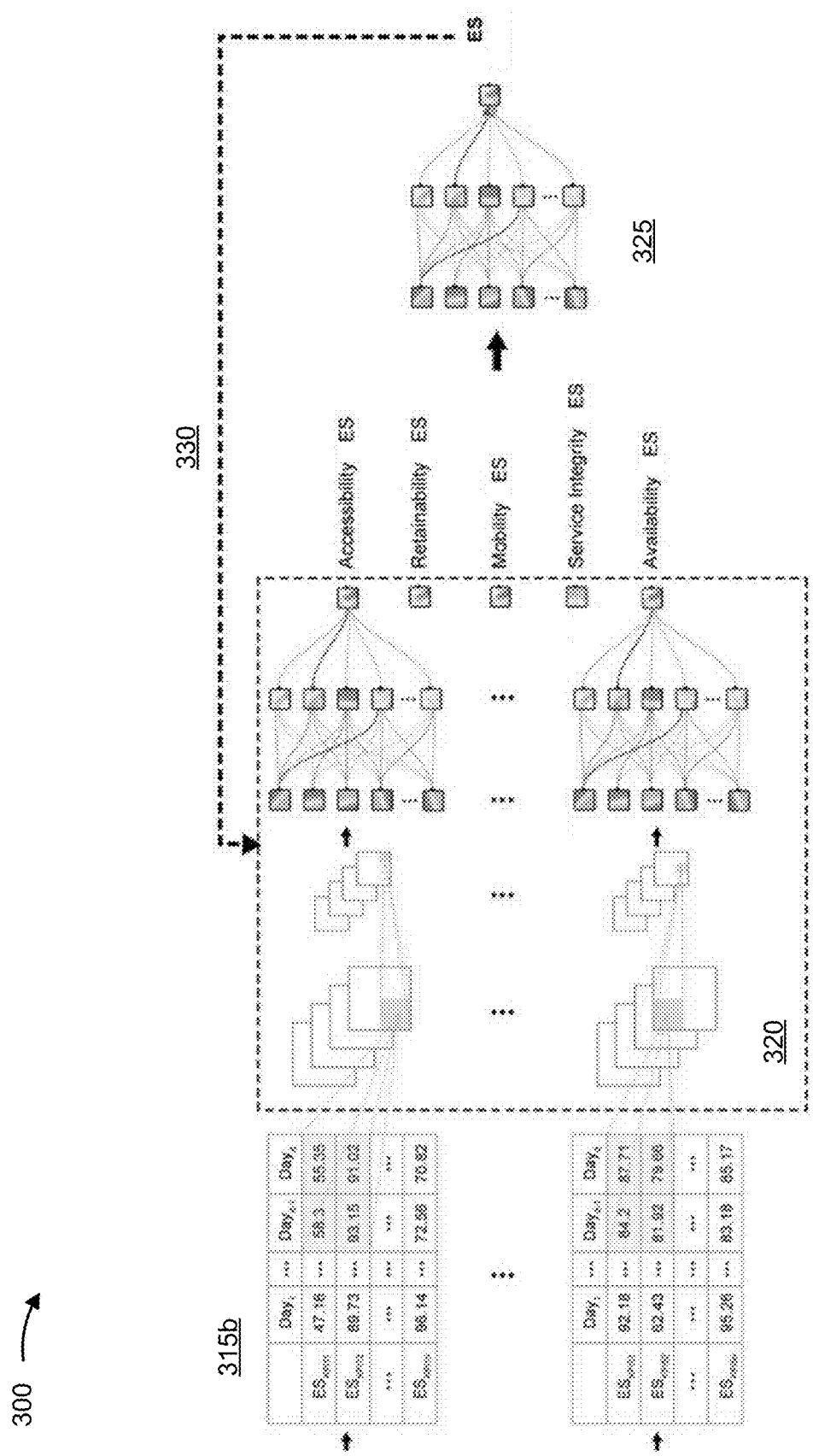

FIGS. 3A and 3B are diagrams of one or more example implementations 300 described herein. As shown in FIGS. 3A and 3B, example implementation(s) 300 may include a process for generating a network experience score (ES) (e.g., a network experience score for voice communications, a network experience score for data communications, and/or a network experience score for SMS communications). In some implementations, the process of example implementation(s) 300 may be implemented by an experience scoring platform (e.g., experience scoring platform 102).

As shown in FIG. 3A, and by reference number 305, the experience scoring platform may obtain network performance data that includes information relating to a plurality of KPIs that respectively belong to a plurality of performance categories in a manner similar to that described elsewhere herein. For example, a first portion of the information may relate to a plurality of KPIs that belong to a first performance category (e.g., accessibility KPIs) and a second portion of the information may relate to a plurality of KPIs that belong to a second performance category (e.g., availability KPIs).

As shown by reference number 310, the experience scoring platform may organize the information of the performance data into a plurality of matrices. For example, the experience scoring platform may organize a first portion of the information (e.g., relating to a plurality of KPIs that belong to a first performance category) into a first matrix and a second portion of the information (e.g., relating to a plurality of KPIs that belong to a second performance category) into a second matrix. A matrix may be populated with values for a plurality of KPIs (e.g., $KPI_{1_1}$-$KPI_{1_n}$ or $KPI_{5_1}$-$KPI_{5_n}$). The values may relate to a time period (e.g., $Day_1$-$Day_d$).

As shown by reference number 315a, the experience scoring platform may normalize the values in the plurality of matrices. The experience scoring platform may normalize the values using an AUC algorithm in a manner similar to that described elsewhere herein.

As shown in FIG. 3B, and by reference number 315b, the experience scoring platform may organize the normalized values into a plurality of normalized matrices. For example, a normalized matrix may be populated with normalized values (e.g., AUC values) for a plurality of KPIs (e.g., $ES_{KPI1_1}$-$ES_{KPI1_n}$ or $ES_{KPI5_1}$-$ES_{KPI5_n}$). The normalized values may relate to a time period (e.g., $Day_1$-$Day_d$).

As shown by reference number 320, the experience scoring platform may process the normalized values in the plurality of normalized matrices using a neural network, such as a convolutional neural network, in a manner similar to that described elsewhere herein. The neural network may output a plurality of performance category experience scores (e.g., Accessibility ES, Retainability ES, Mobility ES, Service Integrity ES, and Availability ES) in manner similar to that described elsewhere herein.

As shown by reference number 325, the experience scoring platform may process the plurality of performance category experience scores using a neural network, such as a feedforward neural network, in a manner similar to that described elsewhere herein. The neural network may output a network experience score (ES) in a manner similar to that described elsewhere herein.

As shown by reference number 330, the experience scoring platform may update a model (e.g., the neural network of reference number 320) with an updated network experience score (e.g., provided by a user) in a manner similar to that described elsewhere herein.

As indicated above, FIGS. 3A and 3B are provided merely as examples. Other examples may differ from what is described with regard to FIGS. 3A and 3B. The number and arrangement of elements shown in FIGS. 3A and 3B are provided as an example. In practice, there may be additional elements, fewer elements, different elements, or differently arranged elements than those shown in FIGS. 3A and 3B. Furthermore, two or more elements shown in FIGS. 3A and 3B may be implemented within a single element, or a single element shown in FIGS. 3A and 3B may be implemented as multiple, distributed elements. Additionally, or alternatively, a set of elements (e.g., one or more elements) shown in FIGS. 3A and 3B may perform one or more functions described as being performed by another set of elements shown in FIGS. 3A and 3B.

Figure 4:
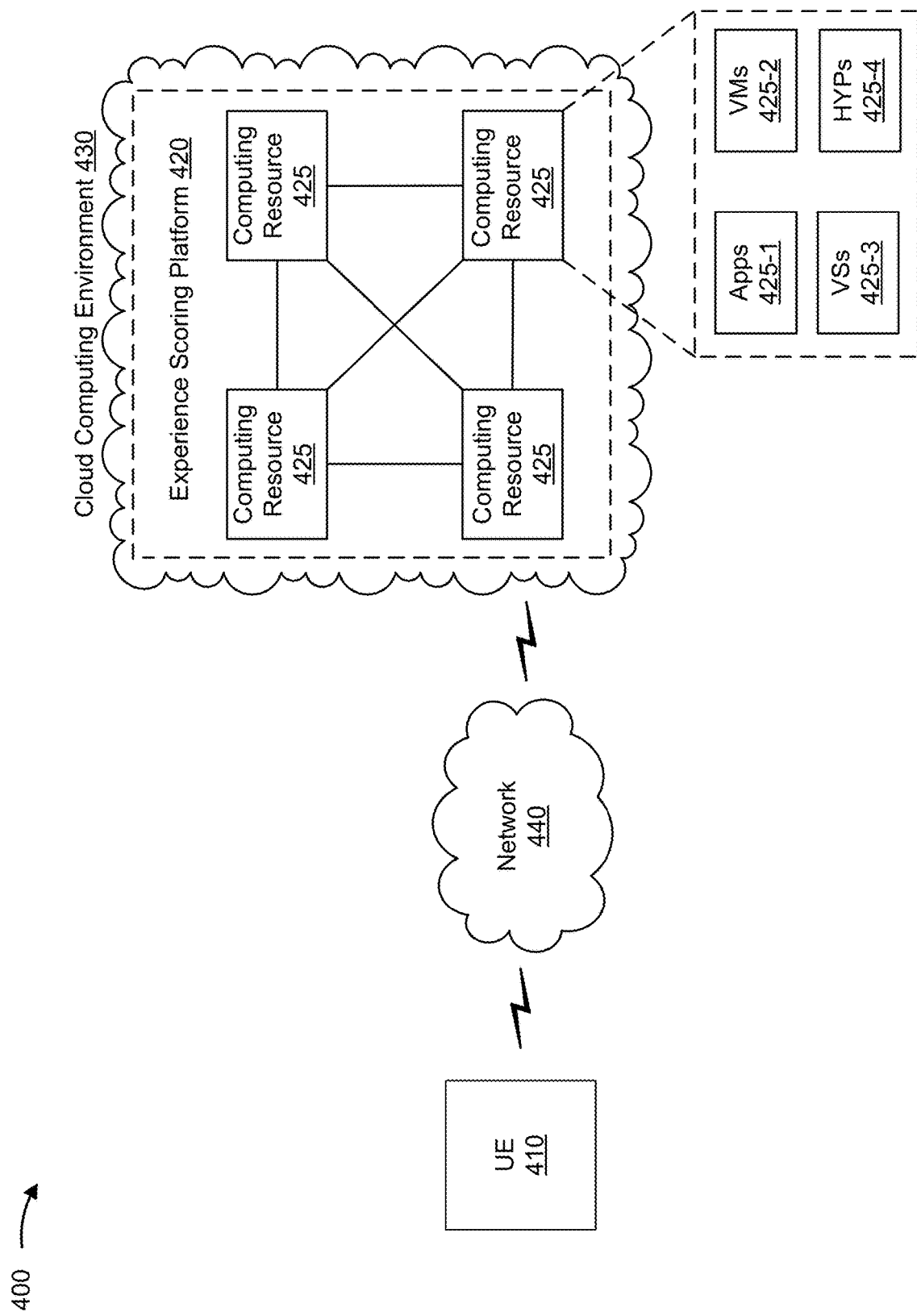
FIG. 4 is a diagram of an example environment in which systems and/or methods described herein may be implemented.

FIG. 4 is a diagram of an example environment 400 in which systems and/or methods, described herein, may be implemented. As shown in FIG. 4, environment 400 may include a UE 410, an experience scoring platform 420, a computing resource 425, a cloud computing environment 430, and a network 440. Devices of environment 400 may interconnect via wired connections, wireless connections, or a combination of wired and wireless connections.

UE 410 includes one or more devices capable of communicating with a RAN and/or a data network (e.g., via a core network). For example, UE 410 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, user equipment, and/or a similar device. UE 410 may be capable of communicating using uplink (e.g., UE to RAN) communications, downlink (e.g., RAN to UE) communications, and/or sidelink (e.g., UE-to-UE) communications. In some implementations, UE 410 may include a machine-type communication (MTC) UE, such as an evolved or enhanced MTC (eMTC) UE. In some implementations, UE 410 may include an IoT UE, such as a narrowband IoT (NB-IoT) UE and/or the like.

Experience scoring platform 420 includes one or more computing resources associated with processing network performance data associated with one or more UEs 410. For example, experience scoring platform 420 may be a platform implemented by cloud computing environment 430 that may obtain network performance data associated with one or more UEs 410, process the network performance data to determine one or more experience scores, perform one or more actions based on the one or more experience scores, and/or the like.

Experience scoring platform 420 may include one or more server devices. In some implementations, experience scoring platform 420 is implemented by computing resources 425 of cloud computing environment 430. Notably, while implementations described herein describe experience scoring platform 420 as being hosted in cloud computing environment 430, in some implementations, experience scoring platform 420 might not be cloud-based or may be partially cloud-based.

Cloud computing environment 430 includes an environment that delivers computing as a service, whereby shared resources, services, etc. may be provided to UE 410, experience scoring platform 420, and/or the like. Cloud computing environment 430 may provide computation, software, data access, storage, and/or other services that do not require end-user knowledge of a physical location and configuration of a system and/or a device that delivers the services. As shown, cloud computing environment 430 may include experience scoring platform 420 and computing resource 425.

Computing resource 425 includes one or more personal computers, workstation computers, server devices, or another type of computation and/or communication device. In some implementations, computing resource 425 may host experience scoring platform 420. The cloud resources may include compute instances executing in computing resource 425, storage devices provided in computing resource 425, data transfer devices provided by computing resource 425, etc. In some implementations, computing resource 425 may communicate with other computing resources 425 via wired connections, wireless connections, or a combination of wired and wireless connections.

As further shown in FIG. 4, computing resource 425 may include a group of cloud resources, such as one or more applications ("APPs") 425-1, one or more virtual machines ("VMs") 425-2, virtualized storage ("VSs") 425-3, one or more hypervisors ("HYPs") 425-4, or the like.

Application 425-1 includes one or more software applications. For example, application 425-1 may include software associated with experience scoring platform 420 and/or any other software capable of being provided via cloud computing environment 430. In some implementations, one application 425-1 may send/receive information to/from one or more other applications 425-1, via virtual machine 425-2.

Virtual machine 425-2 includes a software implementation of a machine (e.g., a computer) that executes programs like a physical machine. Virtual machine 425-2 may be either a system virtual machine or a process virtual machine, depending upon use and degree of correspondence to any real machine by virtual machine 425-2. A system virtual machine may provide a complete system platform that supports execution of a complete operating system ("OS"). A process virtual machine may execute a single program and may support a single process. In some implementations, virtual machine 425-2 may execute on behalf of a user, and may manage infrastructure of cloud computing environment 430, such as data management, synchronization, or long-duration data transfers.

Virtualized storage 425-3 includes one or more storage systems and/or one or more devices that use virtualization techniques within the storage systems or devices of computing resource 425. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 425-4 provides hardware virtualization techniques that allow multiple operating systems (e.g., "guest operating systems") to execute concurrently on a host computer, such as computing resource 425. Hypervisor 425-4 may present a virtual operating platform to the guest operating systems and may manage the execution of the guest operating systems. Multiple instances of a variety of operating systems may share virtualized hardware resources.

Network 440 includes one or more wired and/or wireless networks. For example, network 440 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as one or more examples. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
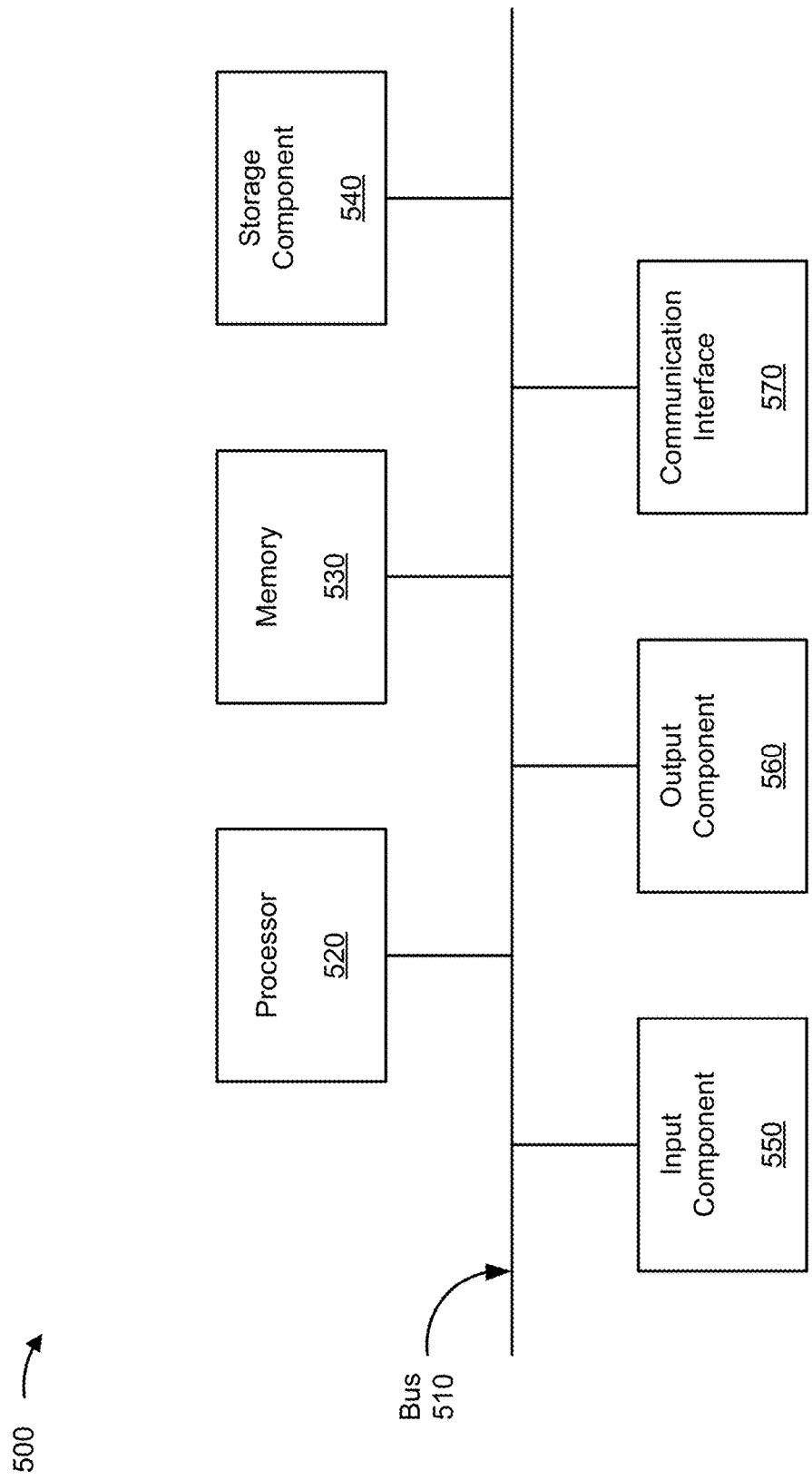
FIG. 5 is a diagram of example components of one or more devices of FIG. 4.

FIG. 5 is a diagram of example components of a device 500. Device 500 may correspond to UE 410, experience scoring platform 420, and/or computing resource 425. In some implementations UE 410, experience scoring platform 420, and/or computing resource 425 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among multiple components of device 500. Processor 520 is implemented in hardware, firmware, and/or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a component for determining location (e.g., a global positioning system (GPS) component) and/or a sensor (e.g., an accelerometer, a gyroscope, an actuator, another type of positional or environmental sensor, and/or the like). Output component 560 includes a component that provides output information from device 500 (via, e.g., a display, a speaker, a haptic feedback component, an audio or visual indicator, and/or the like).

Communication interface 570 includes a transceiver-like component (e.g., a transceiver, a separate receiver, a separate transmitter, and/or the like) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a wireless local area network interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. As used herein, the term "computer-readable medium" refers to a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
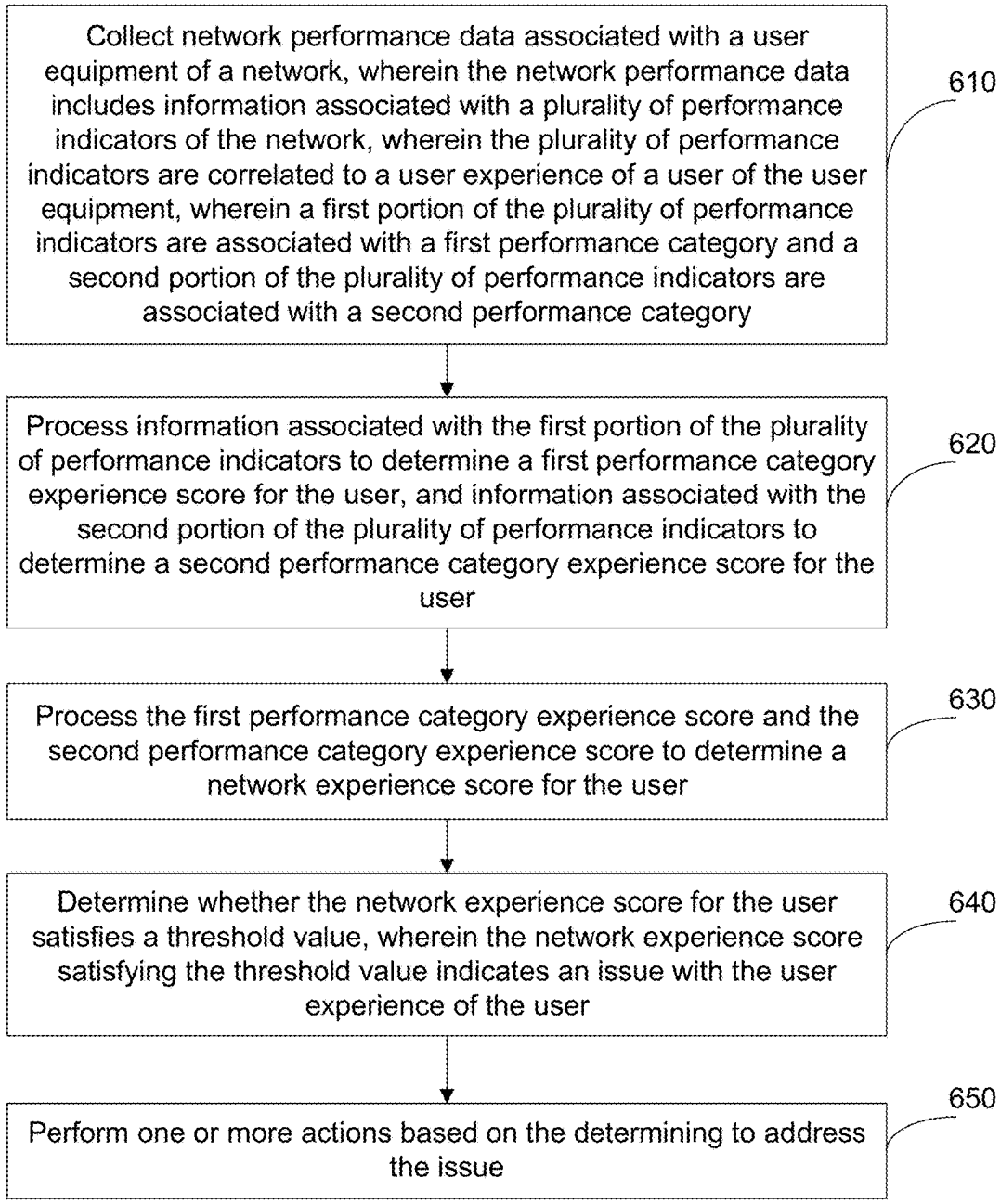
FIG. 6 is a flow chart of an example process for evaluating user experience in a network.

FIG. 6 is a flow chart of an example process 600 for evaluating user experience in a network. In some implementations, one or more process blocks of FIG. 6 may be performed by an experience scoring platform (e.g., experience scoring platform 102 or experience scoring platform 420). In some implementations, one or more process blocks of FIG. 6 may be performed by another device or a group of devices separate from or including the experience scoring platform, such as a UE (e.g., UE 104 or UE 410), and the like.

As shown in FIG. 6, process 600 may include collecting network performance data associated with a user equipment of a network, wherein the network performance data includes information associated with a plurality of performance indicators of the network, wherein the plurality of performance indicators are correlated to a user experience of a user of the user equipment, and wherein a first portion of the plurality of performance indicators are associated with a first performance category and a second portion of the plurality of performance indicators are associated with a second performance category (block 610). For example, the experience scoring platform (e.g., using processor 520, memory 530, storage component 540, input component 550, communication interface 570, and/or the like) may collect network performance data associated with a user equipment of a network, as described above. The network performance data may be collected over a time period. In addition, the network performance data may include information associated with a plurality of performance indicators of the network. A first portion of the plurality of performance indicators may be associated with a first performance category and a second portion of the plurality of performance indicators may be associated with a second performance category.

The plurality of performance indicators may be correlated to a user experience of a user of the user equipment. For example, a first performance indicator of the plurality of performance indicators may be correlated to the user experience when the first performance indicator is correlated to a second performance indicator of an application of the user equipment. In some implementations, a degree of correlation between a performance indicator of the plurality of performance indicators and the user experience may be determined using a model. A performance indicator of the plurality of performance indicators may be included in the plurality of performance indicators if a degree of correlation between the performance indicator and the user experience satisfies a threshold value.

The user experience of the user may relate to one or more of a voice communication experience of the user, a data communication experience of the user, or a message service experience of the user. In addition, the first performance category and the second performance category may relate to an accessibility of service of the network, a retainability of service of the network, a mobility of the user equipment, an integrity of service of the network, or an availability of the network.

As further shown in FIG. 6, process 600 may include processing information associated with the first portion of the plurality of performance indicators to determine a first performance category experience score for the user and information associated with the second portion of the plurality of performance indicators to determine a second performance category experience score for the user (block 620). For example, the experience scoring platform (e.g., using processor 520, memory 530, storage component 540, and/or the like) may process information associated with the first portion of the plurality of performance indicators to determine a first performance category experience score for the user and information associated with the second portion of the plurality of performance indicators to determine a second performance category experience score for the user, as described above.

In some implementations, processing the information associated with the first portion of the plurality of performance indicators and the information associated with the second portion of the plurality of performance indicators may be performed with a first machine learning model. The first machine learning model may be a convolutional neural network model. In addition, the information associated with the first portion of the plurality of performance indicators and the information associated with the second portion of the plurality of performance indicators may be normalized using an AUC algorithm prior to being processed with the first machine learning model.

As further shown in FIG. 6, process 600 may include processing the first performance category experience score and the second performance category experience score to determine a network experience score for the user (block 630). For example, the experience scoring platform (e.g., using processor 520, memory 530, storage component 540, and/or the like) may process the first performance category experience score and the second performance category experience score to determine a network experience score for the user, as described above.

The experience scoring platform may determine, for the user and based on a usage of the network by the user, a voice communication usage for the user and a data communication usage for the user, and the network experience score may be determined based on the voice communication usage and the data communication usage. Additionally, or alternatively, the experience scoring platform may determine a voice communication experience score or a data communication experience score for the user based on the first performance category experience score and the second performance category experience score, and the network experience score may be based on the voice communication experience score or the data communication experience score.

In some implementations, processing the first performance category experience score and the second performance category experience score may be performed with a second machine learning model. The second machine learning model may be a feedforward neural network model.

As further shown in FIG. 6, process 600 may include determining whether the network experience score for the user satisfies a threshold value, wherein the network experience score satisfying the threshold value indicates an issue with the user experience of the user (block 640). For example, the experience scoring platform (e.g., using processor 520, memory 530, storage component 540, and/or the like) may determine whether the network experience score for the user satisfies a threshold value, as described above. The network experience score satisfying the threshold value may indicate an issue with the user experience of the user. The network experience score satisfying the threshold value also may indicate a poor quality associated with the user experience.

As further shown in FIG. 6, process 600 may include performing one or more actions based on the determining to address the issue (block 650). For example, the experience scoring platform (e.g., using processor 520, memory 530, storage component 540, input component 550, output component 560, communication interface 570, and/or the like) may perform one or more actions based on the determining to address the issue, as described above. In some implementations, the experience scoring platform may perform the one or more actions based on determining that the network experience score for the user satisfies the threshold value to address the poor quality associated with the user experience.

The one or more actions may include one or more of: transmitting a notification, to the user equipment, providing information relating to the issue; transmitting a notification, to a customer support terminal associated with the network, providing information relating to the issue; or updating at least one of a first machine learning model or a second machine learning model. In some implementations, the one or more actions may include receiving an update to the network experience score from the user to obtain an updated network experience score, and updating at least one of a first machine learning model or a second machine learning model based on the updated network experience score.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware may be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    collecting, by a device, network performance data associated with a user equipment of a network,
        wherein the network performance data associated with the user equipment of the network includes information associated with a plurality of performance indicators of the network,
            wherein the plurality of performance indicators are correlated to a user experience of a user of the user equipment, and
            wherein a first portion of the plurality of performance indicators are associated with a first performance category and a second portion of the plurality of performance indicators are associated with a second performance category;
    processing, by the device and using a machine learning model:
        information associated with the first portion of the plurality of performance indicators to determine a first performance category experience score for the user, and
        information associated with the second portion of the plurality of performance indicators to determine a second performance category experience score for the user,
            wherein the information associated with the first portion of the plurality of performance indicators and the information associated with the second portion of the plurality of performance indicators are normalized using an area under a curve algorithm prior to being processed by the machine learning model;
    processing, by the device, the first performance category experience score and the second performance category experience score to determine a network experience score for the user,
        wherein the network experience score includes a first network experience score for voice communication for the user and a second network experience score for data communication for the user;
    determining, based on weightings of the first network experience score for voice communication and the second network experience score for data communication, an overall experience score;
    determining, by the device, whether the network experience score for the user satisfies a threshold value,
        wherein the network experience score satisfying the threshold value indicates an issue with the user experience of the user; and
    performing, by the device, one or more actions based on determining to address the issue with the user experience of the user.

2. The method of claim 1, wherein the one or more actions include one or more of:
    transmitting a notification, to the user equipment, providing information relating to the issue, or
    transmitting a notification, to a customer support terminal associated with the network, providing information relating to the issue.

3. The method of claim 1, wherein a degree of correlation between a performance indicator of the plurality of performance indicators and the user experience is determined using a model.

4. The method of claim 1, where the threshold value is a first threshold value,
    wherein a performance indicator of the plurality of performance indicators is to be included in the plurality of performance indicators if a degree of correlation between the performance indicator and the user experience satisfies a second threshold value.

5. The method of claim 1, wherein a first performance indicator of the plurality of performance indicators is correlated to the user experience when the first performance indicator is correlated to a second performance indicator of an application of the user equipment.

6. The method of claim 1, wherein processing the first performance category experience score and the second performance category experience score is performed with a second machine learning model.

7. The method of claim 1, wherein the first portion of the performance indicators or the second portion of the performance indicators relates to voice over Long-Term Evolution (VoLTE) communications or voice over 5G (Vo5G) communications, and
    wherein the first portion of the performance indicators or the second portion of the performance indicators includes one or more of:
        a session establishment effectiveness ratio (SEER),
        a call drop rate,
        a call connection rate, or
        a call setup failure rate.

8. A device, comprising:
    one or more memories; and
    one or more processors, coupled to the one or more memories, to:
        collect network performance data associated with a user equipment of a network,
            wherein the network performance data includes information associated with a plurality of performance indicators of the network,
                wherein the plurality of performance indicators are correlated to a user experience of a user of the user equipment, and
                wherein a first portion of the plurality of performance indicators are associated with a first performance category and a second portion of the plurality of performance indicators are associated with a second performance category;
        process, with a first machine learning model:
            information associated with the first portion of the plurality of performance indicators to determine a first performance category experience score for the user, and information associated with the second portion of the plurality of performance indicators to determine a second performance category experience score for the user,
    wherein the information associated with the first portion of the plurality of performance indicators and the information associated with the second portion of the plurality of performance indicators are normalized using an area under a curve algorithm prior to being processed with the first machine learning model;
process, with a second machine learning model, the first performance category experience score and the second performance category experience score to determine a network experience score for the user,
    wherein the network experience score includes a first network experience score for voice communication for the user and a second network experience score for data communication for the user;
determine, based on weightings of the first network experience score for voice communication and the second network experience score for data communication, an overall experience score;
determine whether the network experience score for the user satisfies a threshold value,
    wherein the network experience score satisfying the threshold value indicates a poor quality associated with the user experience of the user; and
perform one or more actions based on determining that the network experience score for the user satisfies the threshold value to address the poor quality associated with the user experience.

9. The device of claim 8, wherein the one or more processors, when performing the one or more actions, are to perform one or more of:
transmit a notification, to the user equipment, providing information relating to the poor quality associated with the user experience,
transmit a notification, to a customer support terminal associated with the network, providing information relating to the poor quality associated with the user experience, or
update at least one of the first machine learning model or the second machine learning model.

10. The device of claim 8, wherein the one or more processors, when performing the one or more actions, are to:
receive an update to the network experience score from the user to obtain an updated network experience score; and
update at least one of the first machine learning model or the second machine learning model based on the updated network experience score.

11. The device of claim 8, wherein the first machine learning model is a convolutional neural network model and the second machine learning model is a feedforward neural network model.

12. The device of claim 8, wherein the user experience of the user relates to one or more of:
a voice communication experience of the user,
a data communication experience of the user, or
a message service experience of the user.

13. The device of claim 8, wherein the first portion of the performance indicators or the second portion of the performance indicators relates to Long-Term Evolution (VoLTE) communications or 5G communications, and
wherein the first portion of the performance indicators or the second portion of the performance indicators includes one or more of:
a data connection rate,
a radio resource control (RRC) setup failure rate,
an RRC drop rate,
a packet data network (PDN) connection failure rate, or
a context drop rate.

14. The device of claim 8, wherein the first performance category and the second performance category relate to:
an accessibility of service of the network,
a retainability of service of the network,
a mobility of the user equipment,
an integrity of service of the network, or
an availability of the network.

15. A non-transitory computer-readable medium storing instructions, the instructions comprising:
one or more instructions that, when executed by one or more processors, cause the one or more processors to:
collect network performance data associated with a user equipment of a network,
    wherein the network performance data includes information associated with a plurality of performance indicators of the network,
    wherein the plurality of performance indicators are correlated to a user experience of a user of the user equipment, and
    wherein a first portion of the plurality of performance indicators are associated with a first performance category and a second portion of the plurality of performance indicators are associated with a second performance category;
process, using a first model:
information associated with the first portion of the plurality of performance indicators to determine a first performance category experience score for the user, and
information associated with the second portion of the plurality of performance indicators to determine a second performance category experience score for the user,
    wherein the information associated with the first portion of the plurality of performance indicators and the information associated with the second portion of the plurality of performance indicators are normalized using an area under a curve algorithm prior to being processed with the first model;
process, using a second model, the first performance category experience score and the second performance category experience score to determine a network experience score for the user,
    wherein the network experience score includes a first network experience score for voice communication for the user and a second network experience score for data communication for the user;
determine, based on weightings of the first network experience score for voice communication and the second network experience score for data communication, an overall experience score; and
update the first model or the second model based on the network experience score.

16. The non-transitory computer-readable medium of claim 15, wherein the one or more instructions, when executed by the one or more processors, further cause the one or more processors to:

determine whether the network experience score satisfies a threshold value,
    wherein the network experience score satisfying the threshold value indicates an issue with the user experience of the user; and
transmit a notification, to the user equipment, providing information relating to the issue,
transmit a notification, to a customer support terminal associated with the network, providing information relating to the issue, or
cause the customer support terminal to generate a display relating to the issue.

17. The non-transitory computer-readable medium of claim 15, wherein the one or more instructions, when executed by the one or more processors, further cause the one or more processors to:
    determine, for the user and based on a usage of the network by the user, a voice communication usage for the user and a data communication usage for the user,
    wherein the network experience score is determined based on the voice communication usage and the data communication usage.

18. The non-transitory computer-readable medium of claim 15, wherein the first model is a convolutional neural network model,
    wherein the second model is a feedforward neural network model.

19. The non-transitory computer-readable medium of claim 15, wherein both the first model and the second model are to be updated based on the network experience score.

20. The non-transitory computer-readable medium of claim 15, wherein the one or more instructions, when executed by the one or more processors, further cause the one or more processors to:
    process, using the first model, information associated with uncategorized information to determine a third performance category experience score associated with the uncategorized information; and
    process, using the second model, the third performance category experience score to determine the network experience score for the user.

* * * * *